March 30, 1937.  C. MACMILLAN  2,075,738
DYNAMIC BRAKING OF INDUCTION MOTORS
Filed Feb. 26, 1936
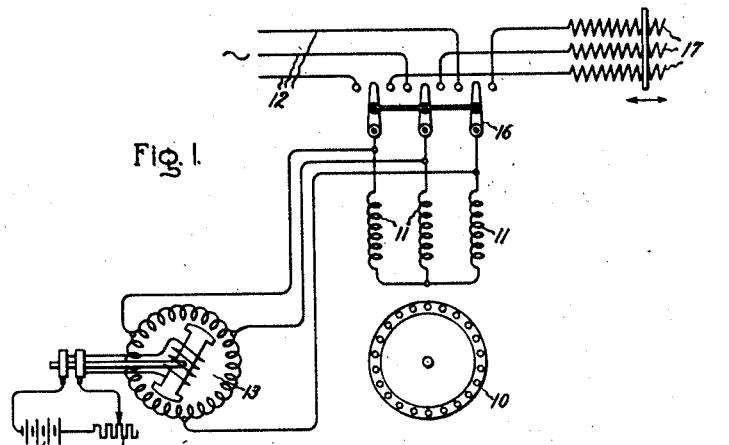
Fig. 1.
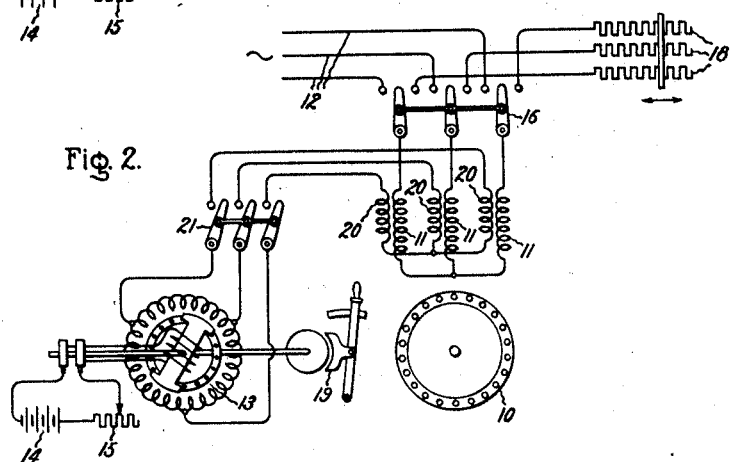
Fig. 2.
Fig. 3.
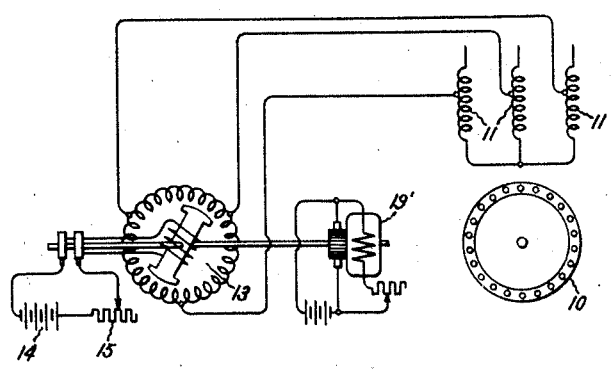
Inventor:
Campbell Macmillan,
by Harry E. Dunham
His Attorney.

Patented Mar. 30, 1937

2,075,738

UNITED STATES PATENT OFFICE 2,075,738

DYNAMIC BRAKING OF INDUCTION MOTORS

Campbell Macmillan, Scotia, N. Y., assignor to General Electric Company, a corporation of New York Application February 26, 1936, Serial No. 65,823

4 Claims. (Cl. 172—274)

My invention relates primarily to the dynamic braking of squirrel cage induction motors and its object is to provide such braking in a way to avoid excessive heating of the motor.

According to my invention, the primary winding of the induction machine is connected to an impedance and is excited by a variable frequency during dynamic braking so that it decelerates as an induction generator with low slip. Since the rotor heating in a squirrel cage machine for a given torque and squirrel cage resistance is proportional to the slip, heating is reduced by exciting with a frequency that is reduced as the speed is reduced, maintaining the slip low and the machine operating close to synchronism with respect to the variable frequency excitation. I prefer also to use a squirrel cage winding of low resistance which further reduces the heat loss in the rotor.

The variable-frequency excitation may to advantage be supplied by a small synchronous condenser, which may be used for power factor correction during induction motor operation if desired. The control of the dynamic braking may be had by varying the excitation or frequency of the synchronous condenser, by varying the dynamic braking impedance, or by a combination of these variables.

The features of my invention which are believed to be novel and patentable will be pointed out in the claims appended hereto. For a better understanding of my invention, reference is made in the following description to the accompanying drawing showing in Fig. 1 a squirrel cage induction motor together with the auxiliary apparatus and circuit connections used for dynamic braking; and Figs. 2 and 3 show modifications. The main difference between Figs. 1 and 2 is that, in Fig. 1, the synchronous condenser is connected directly to the main primary winding of the induction machine and, in Fig. 2, it is connected to a separate exciting winding of the induction machine. In Fig. 2, and also in Fig. 3, the synchronous condenser is provided with a variable loading device in the form of a mechanical brake or dynamo electric machine while, in Fig. 1, this feature is omitted. Fig. 3 shows the synchronous condenser connected across only a portion of the main primary winding of the induction motor.

Referring now to the drawing for a more detailed description, the parts in the three figures which are similar are designated by like reference characters. In each case, 10 represents a low-resistance squirrel cage induction motor secondary and 11 the main primary winding of the motor. 12 represents the regular power supply, which is used when operating the machine as a motor. 13 represents a synchronous condenser, which will preferably be of relatively smaller capacity and of relatively higher speed as compared to the induction machine. The field winding of the synchronous condenser is supplied by a direct-current source 14 through a variable resistance 15 by means of which the voltage of the synchronous condenser may be controlled. 16 represents a double-throw switch whereby the induction machine primary may be connected to the alternating-current source 12 for motor operation or to an adjustable impedance for dynamic braking purposes. In Fig. 1, the adjustable impedance is represented as an inductive resistor 17 and, in Fig. 2, as a non-inductive resistor 18.

In Fig. 1, the alternating-current terminals of the synchronous condenser are connected in parallel with the terminals of the main primary winding of the induction machine. During motoring operations, when the switch 16 is closed to the left, the synchronous condenser will float on the supply lines 12 and may to advantage have its field adjusted to supply a leading current for power factor correction. For dynamic braking, the switch 16 is thrown to the right, connecting the impedance 17 across the winding 11 of the induction machine. The impedance 17 should be of sufficient magnitude to ensure that, on closing switch 16, it will not operate as an effective short circuit to the synchronous condenser 13 acting as a generator, but, on the contrary, will initially restrict the current flowing to a value consistent with the generation of a suitable voltage by the synchronous machine 13. As the induction generator action of the main motor winding 11 delivers increasing energy current to the impedance, sufficient impedance voltage may be sustained at the synchronous condenser terminals during a gradual reduction of the impedance 17. When a sufficiently large dynamic-braking current has been established and is maintained by suitable reductions of impedance during deceleration, the voltage per cycle, and other normal operating characteristics of both machines may be stably maintained throughout the period of deceleration unaffected by the variation of frequency. Because of its greater momentum, the percentage deceleration of the induction machine will ordinarily be less than that of the synchronous condenser. The synchronous condenser supplies leading current excitation to the primary of the induction machine, which then becomes an induction generator giving up its energy of momentum in the form of electrical energy to the impedance 17. This dynamic braking action may be controlled by adjustment of the variable impedance 17, by adjustment of the field current of the synchronous condenser, or both. Some dynamic braking action is also had with respect to the synchronous condenser, which gives up some of its energy of momentum in the form of electrical energy supplied to the impedance 17. The two machines thus decelerate quickly under this dynamic braking action.

An important feature of this arrangement is that, during the dynamic braking action, the excitation frequency of the induction generator is reduced as the speed of the induction machine is reduced so that the slip or difference between the speed of the rotor 10 and the speed of the stator rotating magnetic field of this machine is relatively small. This means that the heating due to the dissipation of the electrical energy occurs largely in the external impedance 17 instead of in the low-resistance squirrel cage winding of rotor 10. This is because the heating in the secondary of an induction machine for a given plus or minus torque and rotor resistance is proportional to the plus or minus slip.

Although effective dynamic braking is obtained, the heat dissipated in the rotor of the induction machine, so far as dynamic braking is concerned, is kept within low limits. A reasonably low temperature of the rotor following a dynamic braking operation is desirable because, in many cases, after quick stopping, it is desirable to start the motor again almost immediately in the opposite direction. Such subsequent quick starting of the motor, which necessarily causes rotor heating, would be seriously handicapped if the rotor was hot to begin with.

In order to obtain dynamic braking action from the induction machine, it is, of course, essential that the excitation frequency supplied thereto be below that corresponding to the synchronous speed of the induction machine at any instant; that is, the induction machine must be running above synchronism with respect to the excitation frequency. In cases where the induction machine and connected apparatus have a natural decelerating tendency greater than that of the synchronous condenser, as, for example, when the induction machine is connected to load apparatus of a character which causes the quick deceleration of the induction machine when it is disconnected from the power supply 12, it will be necessary to produce a proportionally more rapid deceleration of the synchronous condenser in order to effect dynamic braking. In such cases, the synchronous condenser may be provided with some form of mechanical load, such as the adjustable mechanical brake shown at 19 in Fig. 2, by means of which its rate of deceleration may be increased and controlled. With the brake off, the rotating part thereof may also serve as additional flywheel effect, giving a wide range of deceleration control. As shown in Fig. 3 the mechanical brake 19 of Fig. 2 may be replaced by a small adjustable speed motor capable of either deceleration or acceleration relatively to the floating speed of the main motor.

The excitation for the dynamic braking operation may be supplied to an auxiliary winding 20 separate from the main winding 1, as shown in Fig. 2. In such arrangements, the windings 20 and 11 may be of different pole numbers and may be non-inductive with respect to each other, but both inductive with respect to the rotor. In such an arrangement, there is less tendency for the synchronous condenser to supply energy to the dynamic braking resistance 18 even though it be made non-inductive, and it provides a somewhat more complete speed control during dynamic braking especially where the synchronous condenser is provided with the mechanical brake 19 or its equivalent.

In case the synchronous condenser is not needed for power factor correction during normal motor operation and dynamic braking operations are infrequent, the synchronous condenser may be disconnected (see switch 21, Fig. 2) when not needed. The synchronous condenser may be provided with the usual amortizer starting winding so as to be started up by closing the switch 21 before the switch 16 is opened just preceding a dynamic braking action.

In some cases, it may be advisable to supply the excitation for dynamic braking operation across only a portion of the main primary winding of the induction motor as represented in Fig. 3. This connection is in the nature of an autotransformer and permits of using a higher motor terminal voltage than is applied for excitation.

In accordance with the provisions of the patent statutes, I have described the principle of operation of my invention together with the apparatus which I now consider to represent the best embodiment thereof but I desire to have it understod that the apparatus shown is only illustrative and that the invention may be carried out by other means.

What I claim as new and desire to secure by Letters Patent of the United States, is,—

1. In combination, an induction motor having a low-resistance squirrel cage secondary winding and a primary winding, apparatus for dynamically braking said motor comprising an impedance, switching means for connecting said impedance across the primary winding of said motor during a dynamic-braking operation thereof, and a synchronous condenser adapted to be connected across the primary winding of said induction motor and to operate at synchronous speed when the induction motor is operating as a motor and to remain so connected to supply excitation to said motor during a dynamic-braking operation thereof, said synchronous condenser operating, during the dynamic-braking operation, as a synchronous generator at a gradually decreasing speed under its own momentum.

2. In combination, an induction motor having a low-resistance secondary winding and a primary winding, apparatus for dynamically braking said motor comprising an impedance, means for connecting said impedance across the primary winding of said motor during a dynamic-braking operation, a synchronous condenser, and means for causing said synchronous condenser to operate at a synchronous speed corresponding to the rated frequency of said motor when the latter is operating as an induction motor prior to a dynamic-braking operation and to supply excitation to said induction motor during a dynamic-braking operation, said synchronous condenser operating during such dynamic-braking operation as a synchronous generator while decelerating at a rate determined by its momentum and the load thereon.

3. In combination, an induction motor having a low-resistance squirrel cage secondary winding, a main primary winding and an auxiliary primary winding, an impedance and means for connecting the same across the main primary winding of the induction motor for dynamic-braking purposes, and a variable-frequency variable-voltage source of alternating-current supply connected to the auxiliary primary winding of said induction motor to supply excitation thereto and to cause said induction motor to operate as an induction generator during a dynamic-braking operation when its main primary winding is connected to said impedance.

4. In combination, an induction motor having a low-resistance squirrel cage secondary winding and a primary winding, an inductive impedance, means for connecting said impedance across the primary winding of said motor for dynamic-braking purposes, a synchronous generator for supplying excitation to said induction motor to cause it to operate as an induction generator when said primary winding is connected across said impedance, said synchronous generator decelerating during such dynamic-braking operation, and means independent of the speed of the induction machine for controlling the rate of deceleration of said synchronous generator.

CAMPBELL MACMILLAN.